Oct. 7, 1930. T. E. FOULKE 1,777,999
METHOD AND APPARATUS FOR MEASURING RADIATIONS SUCH AS THE ULTRA VIOLET
Filed Sept. 11, 1926 2 Sheets-Sheet 1
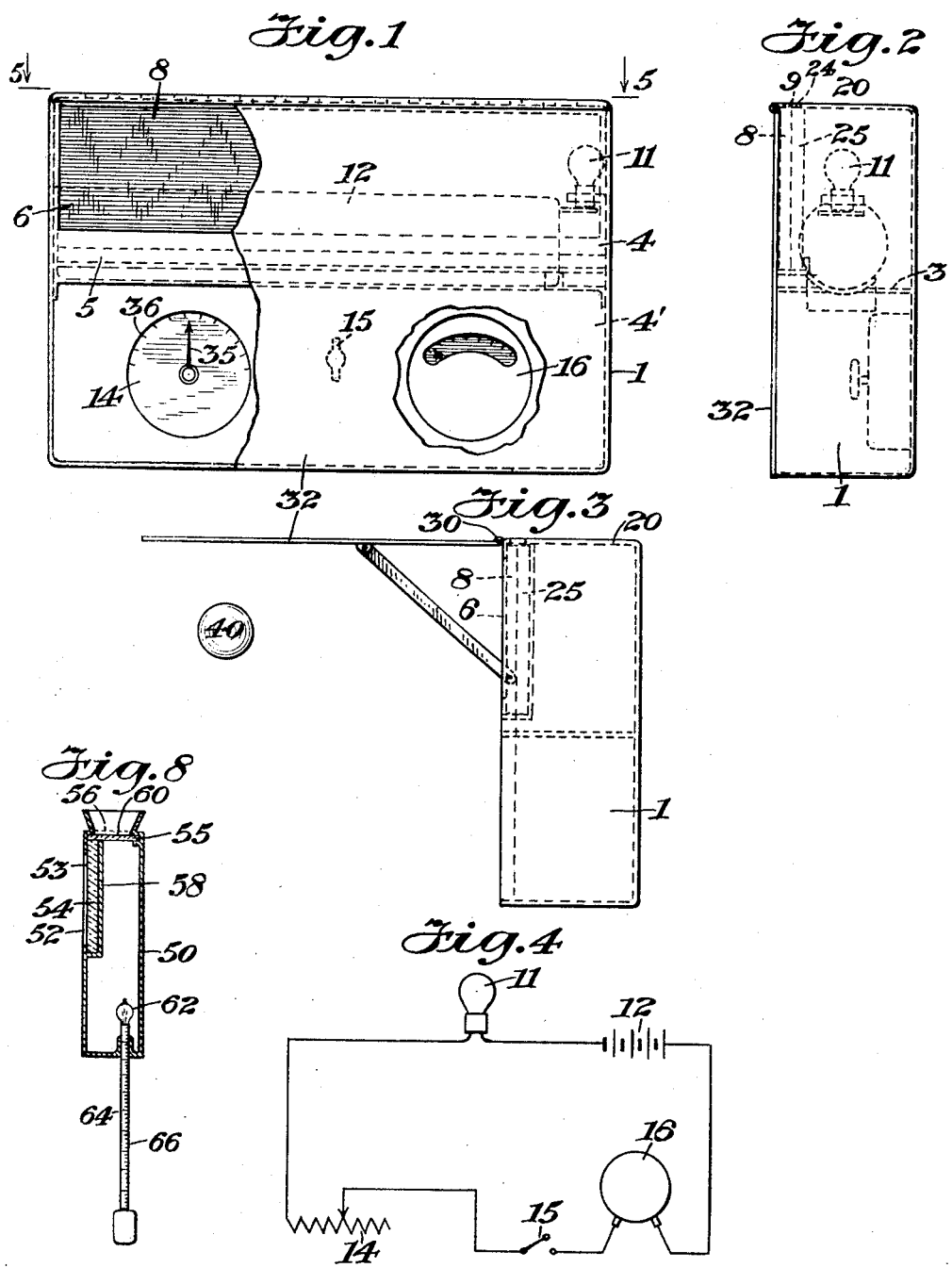

Oct. 7, 1930.  T. E. FOULKE  1,777,999
METHOD AND APPARATUS FOR MEASURING RADIATIONS SUCH AS THE ULTRA VIOLET
Filed Sept. 11, 1926  2 Sheets-Sheet 2
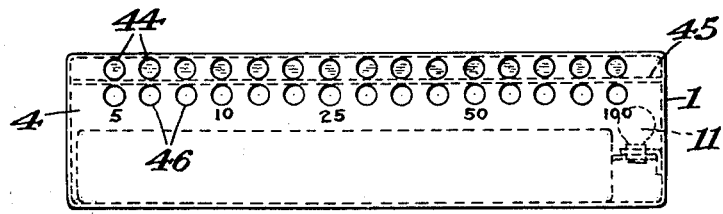
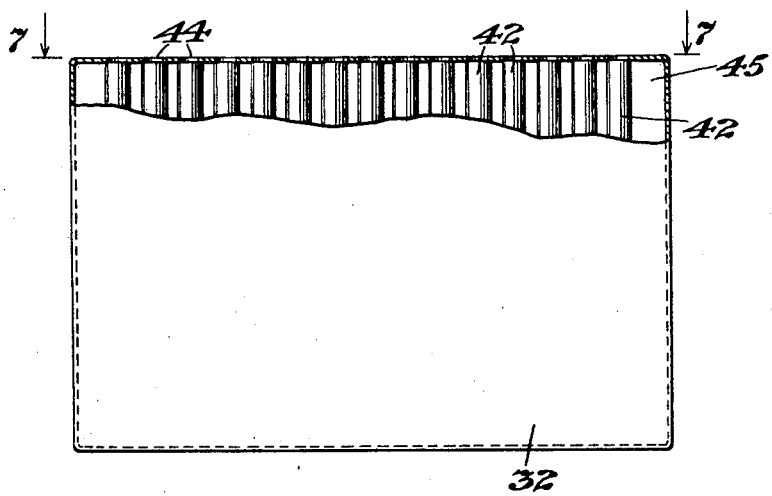
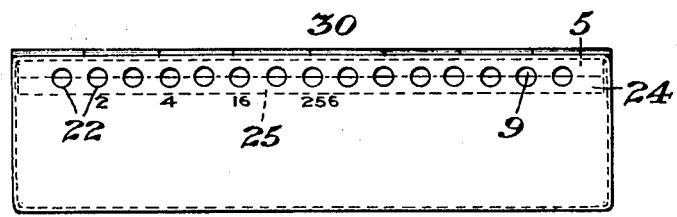
INVENTOR
Ted E. Foulke
BY
Thos. H. Brown
HIS ATTORNEY Patented Oct. 7, 1930

1,777,999

UNITED STATES PATENT OFFICE

TED E. FOULKE, OF NUTLEY, NEW JERSEY, ASSIGNOR TO GENERAL ELECTRIC VAPOR LAMP COMPANY, A CORPORATION OF NEW JERSEY

METHOD AND APPARATUS FOR MEASURING RADIATIONS SUCH AS THE ULTRA VIOLET

Application filed September 11, 1926. Serial No. 134,935.

The present invention relates to method and means for measuring radiations, particularly those in the ultra violet range.

An object of the invention is to measure the intensity of ultra violet radiations by utilizing a fluorescent characterstic of certain glass to transform such radiations into radiations in the visible range. A further object of the invention is to compare such transformed radiations with a standard light.

Various other objects and advantages of the invention will be obvious from the following particular description of the method of the invention and of forms of apparatus embodying the invention or from an inspection of the accompanying drawings; and the invention also consists in certain new and useful methods and features of construction and combinations of parts hereinafter set forth and claimed.

In the accompanying drawings there is shown for purposes of illustration one form of apparatus with certain modifications thereof embodying the invention, in which Fig. 1 is a plan view showing a holding container with apparatus therein and a combined cover and shield in part broken away.

Fig. 2 is an end elevation view thereof,

Fig. 3 is a similar end elevation view but with the cover shield in the open position, Fig. 4 is a diagram of electrical parts and connections, Fig. 5 is a side elevation view looking in the direction of the arrows 5—5 of Fig. 1, Fig. 6 is a diagrammatic view of an alternate embodiment in plan and in part section, Fig. 7 is a side elevation view looking in the direction of the arrows 7—7 of Fig. 6, and Fig. 8 is a diagrammatic view of another embodiment.

Like reference characters denote like parts in the several figures of the drawings.

In Figs. 1, 2, 3 and 5 of the drawing the rectangular container 1 is divided longitudinally by the partition 3 into the compartments 4 and 4'. Said compartment 4 has a top wall or closure 5 which has formed therein the opening 6 which extends substantially the length of the container and across a greater part of the width of compartment 4. A sheet of glass 8 preferably a soda or potash lead glass or a lead glass closes said opening 6. Said sheet 8 on its inner side is provided with an opaque coating such as of black paint and its outer longitudinal edge 9 is preferably frosted or ground, but in some cases is left clear. Within said compartment 4 and at one thereof there is provided a source of light 11 which is a small incandescent electric lamp. A battery cell 12 connected in series with the rheostat 14, switch 15 and ammeter 16 serves to energize the lamp. In the side wall 20 of container 1, against which said edge 9 of the glass sheet 8 abuts is provided the row of openings 22—22 which extend half over said edge 9 and half over the edge 24 of a sheet of glass 25 which is positioned against the blackened side of said sheet 8. Said sheet 25 is in some cases not used and the corresponding sides of holes 22 in that case are left open or are closed by a sheet of translucent blue paper or some other transparent or translucent means. For purposes of reflecting to and through said sheet 25 and presenting at said edge 24 light comparable to that which will be presented at the edge 9 of the sheet 8, the interior compartment 4 is preferably lined with a blue coating such as of paint or paper. Along the row of openings 22—22 there is provided a graduated scale which from the end at which the lamp is situated varies numerically according to the strength of the light from one end of the compartment to the other, that is the scale varies inversely as the square of the distance from said light source 11. On the hinge 30 there is mounted to the top side of container 1 the cover member 32 which serves as a shield in the use of the device and in a manner hereinafter fully described.

Said rheostat 14 is provided with an indicator 35 and scale 36 which is graduated and the ammeter 16 has a similar scale which preferably has indicated thereon a given point which is calibrated at a value at which normal current will pass through the lamp 11 having given electrical and luminosity characteristics.

The plate 8 is chosen of material such as soda or potash lead glass which upon being acted upon by ultra violet radiations fluoresces and has produced therein light which is of a blue color. For example, if ultra violet radiations are caused to pass to a sheet of soft lead glass at one side or face thereof there will be visible at the surfaces of the sheet a light or phosphorescence which is characteristically blue. This light appears particularly concentrated and of high intensity at the edge surfaces. For a given wave length the strength or value of the phosphorescence or light emitted at the surface of the sheet is in direct proportion to the strength or value of the ultra violet radiations which cause or produce such light or phosphorescence. The said sheet of glass 8 is of such a material and its influence in changing ultra violet radiations to visible light or phosphorescence is utilized according to this invention for the purpose of measuring the strength of ultra violet radiations caused to pass therethrough in the use of apparatus of which the above described is used as an example.

In the use of the apparatus above described the shield cover 32 is in the open position as indicated in Fig. 3 and the glass sheet 8 exposed through said opening 6 to a source of ultra violet light which is to be measured and which source is indicated by the figure 40 in Fig. 3, the cover 32 serving to shield the observer from the said source in using the apparatus. The strength of the source 40 may be comparatively measured by illuminating lamp 11 and noting at which of said openings 22—22 the blue light emitted from the edge 9 of said sheet 8 coincides or most nearly coincides in strength or value with the blue light transmitted from the compartment 4 and emitted from the edge 24 of said sheet 25. This comparison is of course arbitrary.

It will be clear then that in comparing the strength of two sources of ultra violet radiation the measuring apparatus above described is placed at the same distance from each source and the scale is read to get a comparative designation or indication on the scale along the openings 22, 22.

In the alternative embodiment shown in Figs. 6 and 7 there is used in place of the glass sheet 8 with its blackened back a row of rods 42 of lead glass each of which has an end abutting against and closing one of the openings 44—44. An opaque partition 45 separates said rods 42 from the light source 11. Parallel with the row and opposite each one of said rods 42 is provided an opening 46 into the light chamber. When desired glass rods are positioned in the light chamber with an end against each one of said openings 46—46 in the manner of the positioning of said rods 42 but in other cases these rods are not used, in which case a cover sheet of glass is or is not mounted within the light compartment and across said openings 46. As in the other embodiment a blue reflecting surface is provided for the light compartment through the openings 46 which is comparable to the blue light or phosphorescence produced at the ends of rods 42. It is to be understood that in cases where glass or other materials are used which produce light or phosphorescence of a different color that means for producing a comparable color in the standard light unit is suitably used. However, in such cases where the intensities of the standard light and the light or phosphorescence which is the measure of the ultra violet radiation is such that the colors need not be the same for accurate comparison and measurement, then the colored linings or filters are dispensed with. In this embodiment as in the other the ultra violet radiations are projected against the sides of the rods 42 for producing light or phosphorescence therein which is projected or emitted at the ends of rods 42 where they may be observed through said openings 44—44.

In the diagram shown in Fig. 8 the casing has a side opening 52 therein against which is exposed the side 53 of the sheet of glass 54 such as of soda lead glass. This sheet also has an edge 55 exposed across one-half of the sight opening 56. At all other sides and edges said sheet 54 is provided with an opaque covering 58. The other side or half of opening 56 opens into the interior of casing 52, with a window 60 of blue or purple glass ground on its inner surface positioned between opening 56 and the interior of casing 52. Within the casing is the standard lamp 62 which is movable toward and from window 60 on the rod 64 on which is marked the arbitrary scale 66.

In the use of this embodiment to measure or compare the strength of an actinic light from a given source the glass sheet 54 is exposed at its side 53 to such source at a given distance and the rod 64 moved to vary the position of lamp 62 until the light emitted at both halves of window 60 coincide in value or strength and a reading taken on said scale 64. The strength of the radiation measure is then considered in terms of this reading and of a reading similarly made with a standard source of radiation.

In another embodiment of the invention the apparatus of Figs. 1 to 5 has in place of the incandescent lamp 11 a standard source of ultra violet light in which case the plate 25 is used and is preferably of the same kind of glass as is said sheet 8.

It is to be understood that in cases where radiations are to be measured which include visible as well as invisible radiations, for example, in cases where actinic light which includes both these classes is used for photographic, color fading, therapeutic or other use that the present device will serve as an accurate means for measuring both kinds and that the claims herein are intended to be in scope to cover such cases. For purposes of measuring radiations which include both visible and invisible or ultra violet uranium glass is suitable because it transforms both sides of the line between the visible and invisible into radiations near the middle of the visible spectrum. It is also to be understood that in cases where radiations of given wave lengths only are to be measured suitable filters are used for the purpose of excluding other radiations from passing to the measuring apparatus.

Although I have shown and described and have pointed out in the annexed claims certain novel features of the invention, it will be understood that various omissions, substitutions and changes in the method and in the form and details of the apparatus illustrated may be made by those skilled in the art without departing from the spirit of the invention.

I claim:

1. In apparatus for measuring the intensity of invisible radiations, means for transforming invisible radiations into visible radiations and for presenting them for observaton comprising a receiving surface of comparatively large area and a radiation transmitting or emitting surface of comparatively small area and at an angle to said receiving surface, means for presenting visible radiations from another source for comparing them with first said visible radiations, and means for varying the strength or intensity of said second visible radiations at the point of presentation for comparison whereby they may be brought to any intensity comparable with that of the first said visible radiations.

2. In apparatus for measuring invisible radiations, means for transforming invisible radiations to be measured into visible radiations, said means comprising a member of soda lead glass, said member having a receiving surface of comparatively large area and a radiation transmitting or emitting surface of comparatively small area and at an angle to said receiving surface, means for shielding said surfaces from each other, and means for presenting a standard light at a given range of variation for comparison with visible light which has been transformed from invisible radiations, and means for shielding said glass member from said light source.

3. In combination in a meter for invisible radiations, a sheet of soda lead glass covered on all surfaces except one face and one edge, a light shield between said face and said edge, means for presenting parallel to said edge a standard light which varies within a given range along said edge.

4. In combination in a meter for invisible radiations, a sheet of soda lead glass covered on all surfaces except one face and one edge, a light shield between said face and said edge, means for presenting parallel to said edge a standard light which varies within a given range along said edge and means for shielding the light from said source at points other than along said edge.

Signed at Hoboken in the county of Hudson and State of New Jersey this 26th day of August A. D. 1926.

TED E. FOULKE.